United States Patent [19]
Collins

[11] Patent Number: 5,862,324
[45] Date of Patent: Jan. 19, 1999

[54] BROADBAND COMMUNICATIONS NETWORK SERVICES ACCESS PLATFORM

[76] Inventor: Francis R. Collins, 176 Rangeley Rd., Chestnut Hill, Mass. 02167

[21] Appl. No.: 294,490

[22] Filed: Aug. 23, 1994

[51] Int. Cl.[6] .................................................. G06F 13/00
[52] U.S. Cl. .............................. 395/200.5; 348/7; 348/12
[58] Field of Search ...................... 348/7–12; 395/200.5; 379/93

[56] References Cited

U.S. PATENT DOCUMENTS

| | | | |
|---|---|---|---|
| 3,803,491 | 4/1974 | Osborn | 455/5.1 |
| 4,343,042 | 8/1982 | Schrock et al. | 455/5.1 |
| 4,689,619 | 8/1987 | O'Brien, Jr. | 340/825.08 |
| 4,723,302 | 2/1988 | Fulmer et al. | 455/2 |
| 4,752,954 | 6/1988 | Masuko | 348/1 |
| 4,961,109 | 10/1990 | Tanaka | 348/3 |
| 5,091,937 | 2/1992 | Kawasaki | 455/2 |
| 5,093,718 | 3/1992 | Hoarty et al. | 348/7 |
| 5,208,665 | 5/1993 | McCalley et al. | 348/12 |
| 5,220,420 | 6/1993 | Hoarty et al. | 348/12 |
| 5,251,324 | 10/1993 | McMullan, Jr. | 455/2 |
| 5,278,988 | 1/1994 | Dejean et al. | 455/2 |
| 5,289,271 | 2/1994 | Watson | 348/1 |
| 5,361,091 | 11/1994 | Hoarty et al. | 348/7 |
| 5,414,455 | 5/1995 | Hooper et al. | 348/7 |

*Primary Examiner*—Mehmet B. Geckil
*Attorney, Agent, or Firm*—Brian M. Dingman

[57] ABSTRACT

A system for controlling access to, service transmission from, and use of an information transmission network which provides an end-user with at will access to the broadband/narrowband service networks deployed in the cable television industry, telephone industry, the multi-media information/services network technology, and the video dial tone industry. Allows the end-user to control the type of services to which such end-user has access to. Network service providers have the ability to provide targeted commercials. Independent interfaced subsystems are combined to yield the network services access system.

12 Claims, 8 Drawing Sheets

GENERIC CABLE TELEVISION NETWORK

GENERIC VIDEO DIAL-TONE NETWORK

NETWORK SERVICES ACCESS PLATFORM

NSAP HOST
FIGURE 4 (400)

FIGURE 5 (500)

THE NETWORK SERVICES IDENTIFICATION/CONTROL SUBSYSTEM
- EXTERNAL CONFIGURATION -
CABLE BASED NETWORK

FIGURE 6 (600)

THE NETWORK SERVICES IDENTIFICATION/CONTROL SUBSYSTEM
- INTERNAL CONFIGURATION -
CABLE BASED NETWORK

THE NETWORK SERVICES IDENTIFICATION/CONTROL HOST SUBSYSTEM
FIGURE 7 (700)

SYSTEM CONFIGURATIONS

BROADBAND COMMUNICATIONS NETWORK SERVICES ACCESS PLATFORM

FIELD OF THE INVENTION

This invention relates generally to a system for controlling access to an information transmission network, and more particularly concerns a system for a plurality of end-users within a broadband/narrowband transmission network to access specific services provided by such an information provision and reception network. Such a system further provides information which allows and describes such access.

BACKGROUND OF INVENTION

Existing one-way network systems are rapidly being retrofitted with two-way capability in response to accelerating technological advances in the field of broadband and/or narrowband information services transmission networking. Such networks are hereinafter referred to as "networks", "broadband/narrowband", or "information networks". In addition, new network systems are being installed initially with two-way capability. These and similar systems provide downstream service by carrying programming signals from a network control and/or programming center(s), hereinafter "center" or "control center", to a desired end-user. Such signals include bandwidths that range from approximately 50 megahertz to the upper end of the transmission spectrum, depending upon the media type used. Upstream signals transmitted from the end-user to the center are typically transmitted over the existing telephone network. Similarly, upstream signals that are transmitted over the network and frequency allocation plans currently in use by cable television operators typically use some or all of the frequency range of 5 to 42 megahertz.

FIG. 1 shows a block diagram depiction of a representative bi-directional cable television distribution system currently in use. A center 100, also referred to as the "head-end" of any type information network, transmits signals onto communication links 110. Links 110 feed the transmission to signal splitters 125 which feed a number of end-users 140 through drop lines 130. End-users 140 are located at a "back-end" of such a network. Return signals from end-users 140 to center 100 are generally routed through existing telephone lines.

Video dial tone systems are also evolving in response to rapid technological advances. A video dial-tone system is a type of broadband/narrowband multi-media transmission network system where channels are leased by cable television operators and other information service providers. This type of system merely provides service signal transport and it is anticipated that current frequency allocations will apply. Virtual channels for encoded and/or compressed signals included in these systems will consequently provide a multiplicity of information rates and channel bandwidths.

FIG. 2 shows a block diagram depiction of a representative bi-directional video dial tone network. Such systems add levels of switching 200 and 210 to the broadband network and provide multi-media transmission similar to those systems as described previously. Video dial tone systems furthermore can switch a multiplicity of service providers between a multiplicity of channels.

Broadband/narrowband network communications existent on local, metropolitan, and wide area networks typically rely on communication protocols, such as Token Ring, Ethernet, or Fiber Distributed Digital Interface, to control communications to and from the end-user terminals connected to the network. The interface between the network and the end-user is a network interface module which provides the physical and electrical connection and the proper communication protocol. The use of the network is determined by requiring the end-user to start a session of use by connecting to the network over the public telephone/data network, or through dedicated circuits, and "signing-on". The sign-on is often completed by entering a secured password. "Signing-off" is required at the completion of the session. The sign-on, password, and sign-off information and time are recorded and used to determine usage and other statistical information. No information, other than real time prompts, which facilitates the end-user's access is conveyed from the network controller to the end-user's equipment. Similarly, no information which is based on the end-user's unique selection of services is captured and retained locally within the network and transmitted to the network control center.

Attendant to each of these network systems is the need to provide the end-user with the ability to select from a plurality of services and/or information providers and to properly record those selections for use by the information services provider for customer verification, service billing, and other related purposes. The known manner of providing such a function, however, is industry dependent. By way of example, the cable television industry uses both a services "subscription" and a "pay-per-view" procedure for dissemination and costing the reception of its signals. Single cable systems supply all of the services in the broadband signal spectrum and are presented to the premises of the end-user in the form of a "basic" and a "premium" service. Dual cable systems commonly provide the basic service on one cable and the premium service on a second cable. In both cases, however, the entire broadband spectrum is being transmitted continually to the end-user's premises.

In either single or dual cable systems, basic services are able to be viewed upon connection to the cable television network for the payment of a basic service charge. The premium services similarly are transmitted on conditioned signals which are not capable of being viewed without a cable television company provided set-top terminal having the capability of unlocking the inverse signal conditioning on the channel(s) carrying the service(s).

Subscription end-users generally pay for specific services on a monthly basis. The billing for this service is based exclusively upon a set of end-user's entries in a billing database at the center. Pay-per-view end-users further call into the center and order a distinct program for a specified time. This process causes an entry into the billing database for that end-user and the pay-per-view charge is entered on the next bill with the subscription charge. The network control center then unlocks the inverse signal conditioning circuits in the set-top terminal on the channel which will carry the conditioned signal. These reverse conditioned channels are then moved from the channel on which they reside in the broadband spectrum and applied to the input of the television set or video cassette recorder on one of a few specific channels, typically channels 3 or 4, which is used to interface the set-top box with the end-user's video cassette recorder or television set.

There are many operational deficiencies with the known system configurations, primarily because of the limitation of currently available access technology. Specifically, the inverse signal conditioning function is available in a number of devices which are readily available in the underground electronics marketplace. The fact that every channel on the broadband spectrum is available at the customer's premises allows the use of such underground electronic devices for the theft of services.

Furthermore, the necessity of applying inverse signal conditioning on a service-by-service basis requires a single input and output port set-top terminal per unit of customer premises equipment if each unit is used to access a different service. Continuing with the cable television case as a consistent example, an end-user who desires to record one premium program while viewing a second premium program necessarily must have two set-top terminals; one for the video cassette recorder and another for the television. Cable service operators only provide one set-top box per end-user, even if more than one premium channel is subscribed. If a second set-top box is desired, the end-user must pay an additional installation charge and an additional monthly charge. Where multiple premium services are being subscribed, the existing network configuration thus creates a bottleneck at the set-top box level which is only designed to be wide enough for one service at a time. An end user can pay for many services but can use only one service at a time.

In addition to creating a bottleneck in the network, the set-top terminal significantly constrains the ability of the end-user to exercise the features inherent in contemporary consumer video electronics, such as picture-in-picture features. Feature rich television sets are thus reduced to simple video monitors operating on either channel 3, 4, or the like when used with set-top technology.

Video dial tone services, mentioned previously, are providing broadband services from a number of competitive multi-media information service providers that are available to many potential end-users. These services further exasperate the current subscription and network use problems. Multiple premium services are now available from multiple vendors. Should video dial tone meet its promise and the Federal Communication Commission's expectations, such vendors will be competing on a service-by-service basis. Each vendor will be required to protect their service from theft and ensure payment for its use. The services will be signal conditioned for protection and each vendor will have its own unique signal conditioning protection. For there to be true competition, however, end-users will be required to have a compliment of set-top boxes for each vendor. This situation creates a multiplicity of installation costs and recurring monthly costs. Absent the end-user absorbing these exaggerated costs, there will therefore be no true competition between such broadband service vendors.

Additional technical, operational, and economic deficiencies to the present cable television and video dial tone networks are existent. Such deficiencies include the elimination of impulse buying of services, the inability to: a. provide directed commercial advertising, b. automatically bill for services used, c. use services without presubscription, d. understand which channels end-users are using, e. to prevent theft of services, and f. provide billable services without an apparatus in the customer's home.

There have been attempts in the prior art at monitoring data network system usage at the customer's premises to aid in building databases typically used for billing the end-user. One monitoring method, utilized specifically in the television industry, identifies a local oscillator signal and its harmonic radiation and/or propagation which thus identifies the particular frequency being used by the end-user. This method and an apparatus to accomplish the same is disclosed in U.S. Pat. No. 4,723,302 to Fulmer et al., which is incorporated herein by reference. The local oscillator signal, however, is a parasitic effect of a television and essentially an undesired result. Consequently, future televisions will eventually eliminate it, thus rendering such methods of detection obsolete and unusable.

Another method of monitoring end-user use at the customer premises includes measuring the flyback voltage variations at the picture tube. Such a system is similarly inefficient.

Each of these devices and methods suffers from the same operational and practical problems discussed previously.

Accordingly, there is a great need for a broadband/narrowband information provision and reception network that allows a multiplicity of end-users to more conveniently and efficiently obtain customer unique access and select at will from a broad range of service and/or information providers. Such a system optimally includes an efficient means for recording those selections for use by the service provider for customer verification, service billing, and other related purposes. There is a further need to provide product commercial information important to specified groups of customers rather than commercials of a generic nature that are arbitrarily disseminated to broad groups. In addition, there is also a need to transform optimized multi-media signals to signals that are useful to end-user's existing equipment.

SUMMARY OF INVENTION

It is therefore an object of this invention to provide a device that provides efficient, reliable, and secure access to services within the complete frequency spectrum being transmitted across a network and to bill an end-user accordingly.

It is similarly an object of this invention to provide a device that allows access to a broadband/narrowband network which uses current and future digital compression encoding for end-users in a form that is compatible with end-users' existing equipment.

It is also an object of this invention to provide a device that allows selective, variable billing of an end-user based upon use and not necessarily upon flat rates.

It is a further object of this invention to prevent the theft of network broadcast services.

It is another object of this invention to provide a transmission system that allows for targeted commercial substitution for selected audiences.

It is still an object of this invention to provide a device and method that efficiently and conveniently monitors network usage.

It is yet another object of this invention to eliminate the need for multiple set-top descrambling boxes.

It is an additional object of this invention to eliminate the need for inverse signal conditioning in delivering a signal through a network to an end-user.

It is also an object of this invention to provide access to a bi-directional information transmission network that allows end-user's to conveniently, and at will efficiently select among multiple vendors and services.

It is a further object of this invention to provide a system that efficiently manages and processes bi-directional information on a bi-directional network.

It is still an object of this invention to allow directed transmissions to specific end-users in a information transmission network.

It is yet another object of this invention to efficiently and conveniently deliver a service signal to an end-user upon request of that end-user.

It is an additional object of this invention to provide bi-directional multi-media information transmission network access that is compatible with cable television, video dial tone, broadcast television, satellite transmission, wireless multimedia, and other multi-media network configurations.

It is still another object of this invention to provide a device that is able to monitor the selected channel of a television with or without utilizing the local oscillating frequency or any of its associated harmonics.

This invention results from the realization that convenient and efficient multi-media information transmission across an information network can be accomplished by utilizing a bi-directional network, or one that is made bi-directional, that delivers services on either an end-user request basis or by merely monitoring end-user usage and billing accordingly. Such a bi-directional network necessarily must utilize a supporting apparatus that receives, processes, and transmits data signals, and facilitates the inclusion of this information into an end-user database and administration system.

The above and other objects are achieved in accordance with the present invention which, according to a first aspect provides a network services access platform host that receives, transmits, processes, and stores information signals at the head-end of a transmission network. The host includes a CPU responsive to a information storage means, a means for interfacing with a head-end database, a means for communicating with at least one element in the network, and a means for receiving program information and other programming commands that control the output of the communicating means. The CPU includes at least one 64/32 bit master processor and at least one 32/16 bit associated processor, the noted processors also known as $2^N/2^{N-1}$ processors, as well as RAM, ROM, and mass storage memory. The flow of information is automated between the head-end and host, as it provides formatted and unformatted data output.

According to a second aspect of the invention, a network service access platform is disclosed that provides an active link between the head-end and back-end of a information transmission network. Such an apparatus includes a CPU responsive to an operating system, a first and second interfacing means for the back-end and head-end of the network respectively, a means for communicating with the head-end, and a means for processing signals. The CPU includes a 32/16 bit processor, the noted processors also known as $2^N/2^{N-1}$ processors, analog/digital and digital/analog circuits.

According to a third aspect of this invention, a network services identifier apparatus for identifying a first signal to be transmitted from the back-end of a network toward the head-end of said network is disclosed. The apparatus includes a means for detecting the first signal from the back-end of the network, a means for interfacing with the head-end of the network, a first means for transmitting the first signal through the interfacing means, and a CPU responsive to an operating system. The apparatus further includes a mean for receiving a second signal from the head end of the network.

According to a fourth aspect of this invention, an alternative embodiment of a network services identifier apparatus for identifying a first signal to be transmitted from the back-end of a network toward the head-end of that network is disclosed. Such an apparatus includes a means for connecting to the back-end of the network to receive the first signal, a means for interfacing with the head-end of the network, a first means for transmitting the first signal through the interfacing means, and a CPU responsive to an operating system. The connecting means includes a connecting cable. The apparatus further includes a mean for receiving a second signal from the head end of the network.

According to a fifth aspect of the invention, a network services identifier host that receives, transmits, processes, and stores data at the head-end of a information transmission network is disclosed. Such a device includes a means for communicating with the back-end of the information transmission network, a means for interfacing with a head-end database, and a CPU responsive to an operating system.

According to a sixth, seventh, and eighth aspect of this invention, a system for controlling access to, transmission, and use of a information transmission network incorporating the above noted subsystem inventions is disclosed. A preferred embodiment of such an system includes the combination of a network service access platform that provides an active link between the head-end and back-end of the network, a network services access platform, host that receives, transmits, processes, and stores data at the head end of that network, and a network services identifier apparatus having a detecting means. Such a system may also be used with a network services identifier apparatus having a connecting means. An alternative embodiment utilizes the above combination without the network services identifier.

An alternative embodiment includes the network services identifier, either with the connecting means or with the detecting means, in combination with a network services identifier host that receives, transmits, processes, and stores data at the head end of a information transmission network.

DISCLOSURE OF PREFERRED EMBODIMENT

Other objects, features, and advantages of this invention will occur to those skilled in the art from the following description of a preferred embodiment and the accompanying drawings, in which:

Turning first to FIG. 1, there is shown a generic cable television network.

The present invention provides end-user access to broadband/narrowband service networks deployed in the cable television industry, telephone industry, multi-media information network technology industry, the convergence of all three industries in the implementation of video dial tone, synchronous optical networks (SONET in the United States) and/or synchronous digital hierarchy networks (SDH) in the rest of the world. In addition, the invention and its associated component subsystems further allows for the efficient and convenient selection and restriction of services, the analog and/or digital signal conditioning necessary for the provision of services, and the formulation of usage databases for many industry applications, including the generation of end-user usage bills.

The subsystem inventions within the combination invention include a Network Services Access Platform, hereinafter referred to as "NSAP", a Network Services Identification/control Subsystem, hereinafter referred to as "NSIS", the Host equipment serving each, specifically the "NSAP Host" and "NSIS Host", and the hardware and software which constitute their operational environments as systems. The combination of the aforementioned subsystems will be discussed immediately after each subsystem is discussed individually.

Figure 1:
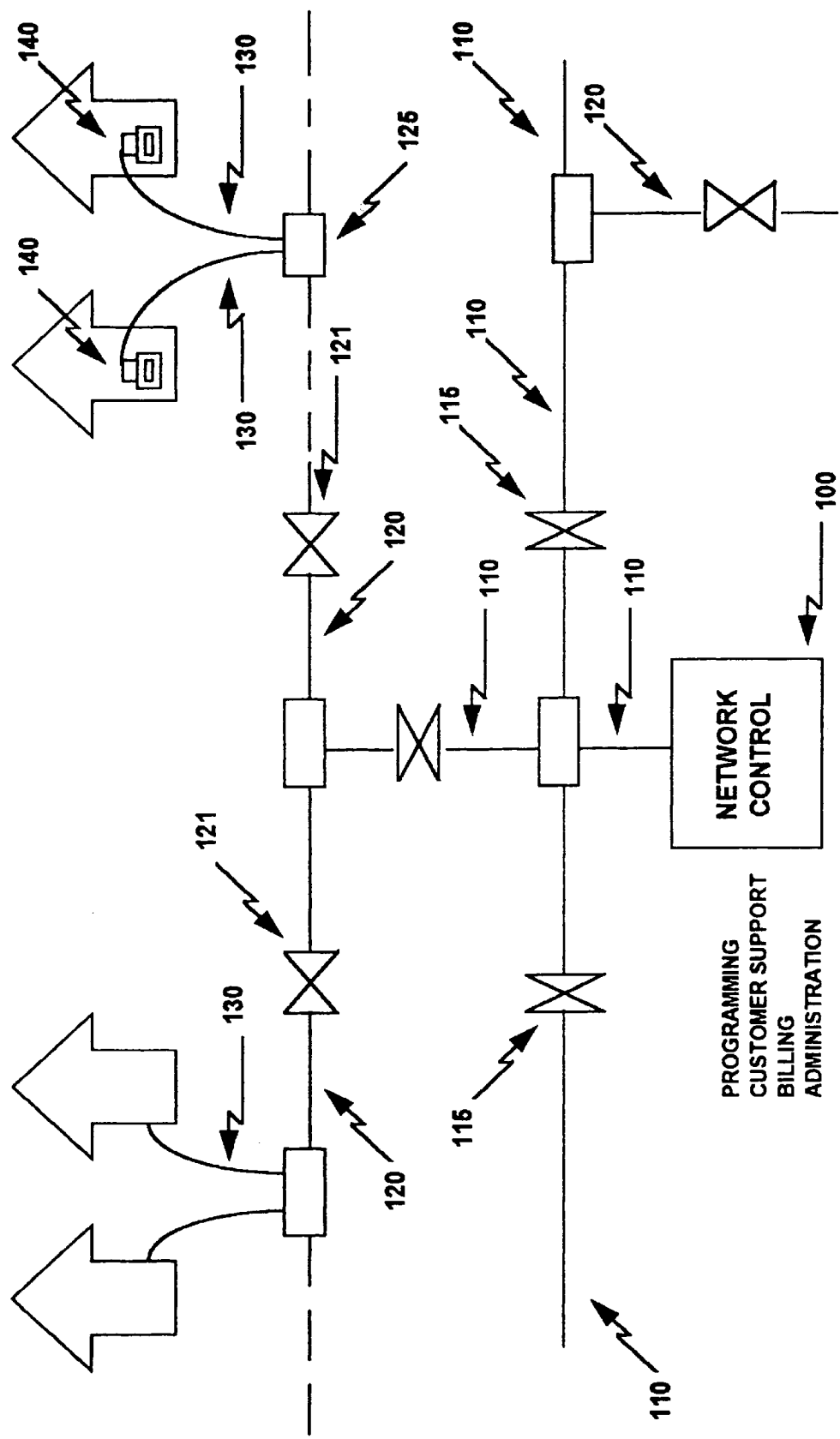
Figure 2:
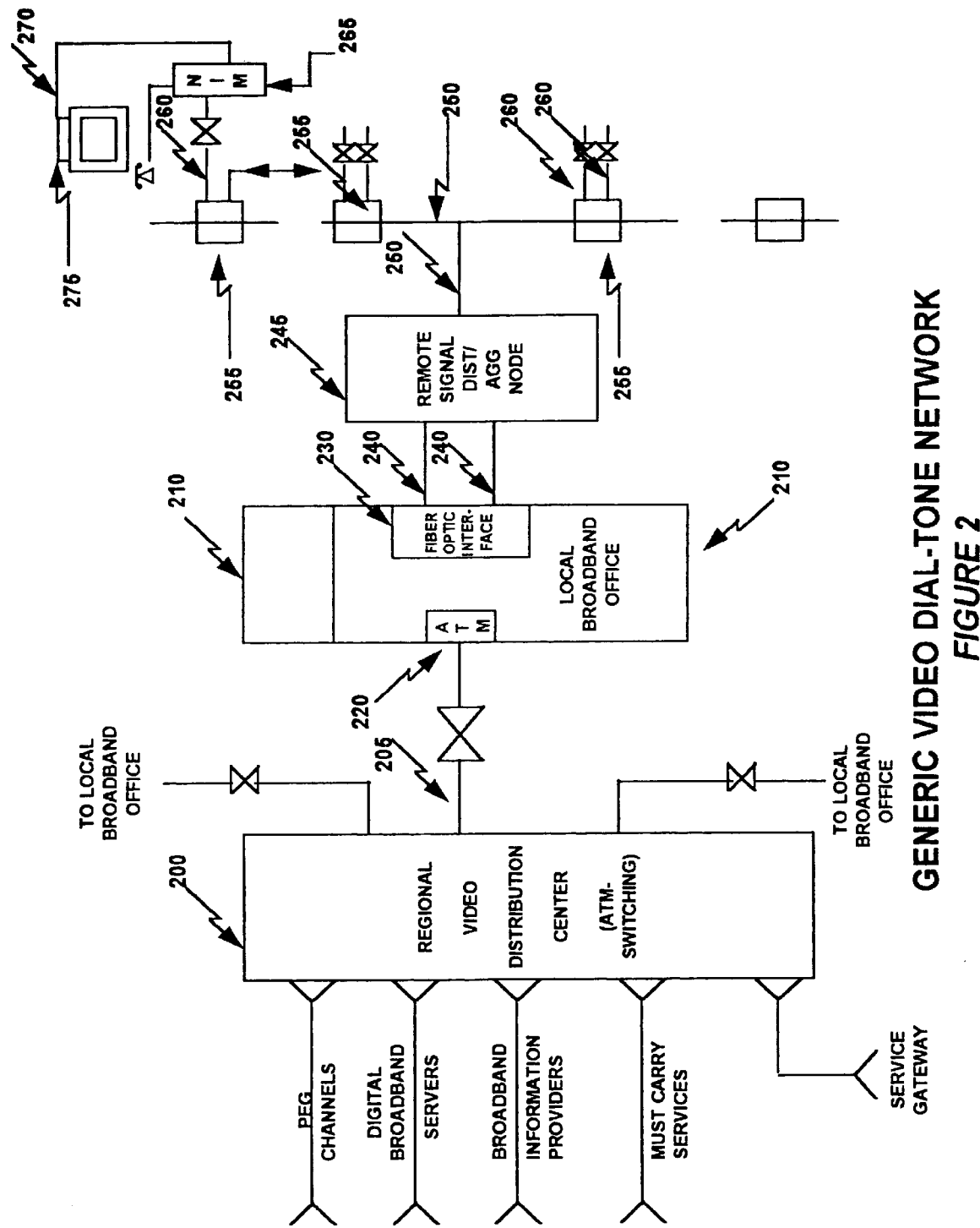
FIG. 2 shows a generic video dial-tone network.
Figure 3:
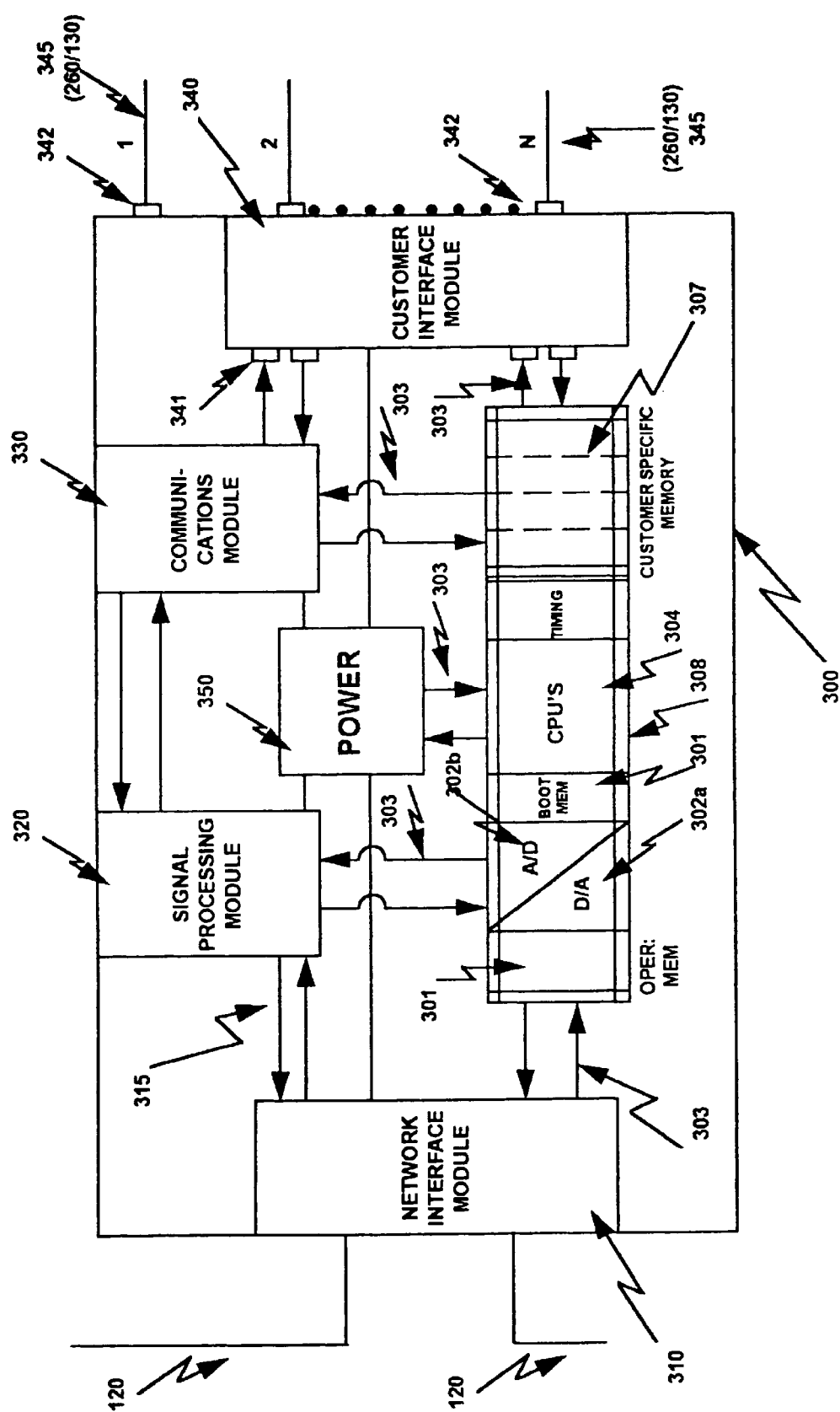
FIG. 3 shows a block diagram of a preferred embodiment of the internal subsystems within a network service access platform.

There is shown in FIG. 3 a block diagram of a preferred embodiment of the internal subsystems within a network service access platform 300, a/k/a "NSAP" 300. NSAP 300 is comprised of equipment located within the distributive portion of a broadband/narrowband transmission network which provides a means by which end-users can obtain services from broadband and/or narrowband service provision "wire" or "wireless" networks. It broadly provides an active access link between the head-end and back-end of such transmission networks in the reception, transmission, and processing of transmitted service information signals as it serves as the primary single interface between the end-user and the network. A set of data records, which will allow proper billing for those services utilized, are also generated as a result of end-user use. NSAP 300 may operate as a stand alone system or in conjunction with other components of a information transmission network system. The other noted components, which include the prior noted NSAP Host and NSIS, will be discussed later in detail.

NSAP 300 is comprised of four modular parts that are controlled by a fifth part, namely a digital processing platform 308, also referred to as central processing unit 308. CPU 308 is configured with a high speed 32/16 bit processor 304, volatile and nonvolatile memory 301, analog-to-digital 302a and digital-to-analog circuits 302b, and interface circuits 303 which interface to the other subsystems within the combination invention.

The connection to the network is through a second module, the network interface module 310. Network interface 310 provides the physical, photonic, and/or electrical interface to the network transmission medium. This medium may be coaxial cable, fiber optic cable, paired cable, or any of the known wireless techniques. In addition, the network topology may be operated with any transmission protocol. Network interface module 310 is capable of being customized to be compatible with each of the prior noted transmission media. The primary function of network interface 310 is to interface with the various network media which require unique electrical and physical properties on one side, as it provides a standard but proprietary interface to the internal modules on the second side of NSAP 300.

Some existing applications of digitally encoded compressed television signals utilize twisted pair copper cable and Asymmetric Digital Subscriber Loop transmission. One embodiment of network interface 310 provides the unique electrical and physical interface for these services.

The third module is a signal processing module 320, which process signals in both directions on the network. Specifically, signal processing module 320 provides a means for encoding and decoding signals, and a means for translating signals within the network. Signal processing module 320 includes two embodiments, namely analog and hybrid analog/digital. The analog embodiment is for use with existing analog video networks and/or analog transmitted multi-media signals which fall within the NTSC, SECAM, or PAL bandwidths and frequency allocations in each deployment. The hybrid analog/digital embodiment is utilized for interfacing with digitally transmitted video, broadband data, or multi-media signals. These signal processing chains will service the known transmission formats because they are software based and their operating systems reside in non-volatile, down-line loaded memory. This down-line load capability allows the memory to be changed to match changing service needs. A third embodiment of signal processing module 320 is completely digital and is used with systems that are completely digital.

Signal processing module 320 also interfaces with and operates under the control of CPU 308. Signal processing module 320 accepts commands from the end-user as detected by CPU 308. These commands are then used to provide the signal processing required to provide a connection to service.

A communications module 330 provides communications to and from the network control center. This information includes down-line loading of generic operating system or application program information into CPU 308, down-loading of customer specific information for service provision control into a customer specific memory 307, up-loading of information related to customer network service usage or unit diagnostic information, and other related information. In one embodiment, communications module 330 interfaces with network interface 310, signal processing module 320, and a customer interface module 340 on one side and CPU 308 on the other side.

There are cases where it is necessary for communication signals to be transmitted over media different than those of the network. Communications module 330 is adaptable to such a case. Existing cable television networks, for example, commonly are characterize as one-way, downstream networks. In such cases, it would be necessary to provide communications in some other manner than over the existing network. In this application, single or multi-point drop lines are connected to telephone wires for up-stream information transmission. In such a case, communications module 330 would interface with the external transmission media rather than through network interface 310.

In all embodiments, communications module 330 transmits and receives information. For transmission, it accepts information whose source is internal to NSAP 300, formats it into readable NSAP/HOST or NSAP/NSAP digital communications protocol, which includes an identification of the end-users to which the customer specific information applies, translates this protocol to signaling formats, and outputs that format to the transmission medium. For reception, communications module 330 accepts addressed information and translates it from the network signaling formats into the format used internal to NSAP 300.

A customer interface module 340 provides for the connection to the customer's premises. A drop cable 345 serves as the connection between NSAP 300 and the customers premises in a preferred embodiment. Other embodiments include a means for connecting to the customer premises through fiber optics and wireless transmission means. Customer interface module 340 provides a standard interface for signal processing module 320 and other modules as it provides interfaces for all of the potential subscriber drop media mechanical and electrical connection requirements and its external input/output ports 342.

A power module 350 provides power to each the modules within NSAP 300. It includes a means for receiving power from a conventional network system power supply.

Each of the subsystems/modules disclosed within NSAP 300 is comprised of conventional hardware and software systems known in the art.

NSAP 300 serves to expand the quality and functionality of end-user's access to broadband/narrowband services. It does so by having flexible multi-variant interfaces, both on the network distribution side of NSAP 300 and on the customer drop side of NSAP 300. NSAP 300 typically serves two, four, eight, or more end-users. It allows a single hardware design with specialized interface modules to serve a multiplicity of markets. Those markets include cable television, video dial tone, broadband data, remote meter reading, multi-media applications distributed via wire or wireless, broadcast television, and space satellite based technology.

NSAP 300 provides the ability to determine and record usage by service accessed, convert encoded and/or compressed signals from the network control and programming center to those necessary to interface with standard customer premises equipment, accept signals from the customer premises equipment representing commands and take actions dependent on those commands, including encoding/decoding them and re-transmitting the outcome to the "head-end" or to another NSAP, accept signals from the "head-end" or another NSAP and take actions with respect to a single end-user, and group end-users. The specific applications desired either by the end-user, the network operator, or the service provider will determine which NSAP functions are automatically used, under program control, and in what mixture.

Once loaded with software, NSAP 300 operates as an independent system element under the administration of an NSAP host 400, which is located at the network control/programming center, previously referred to as the "head-end" of the network. NSAP host 400 prepares and downloads software modules into NSAP 300 and receives diagnostic and end-user database information from NSAP 300 in up-load modules. NSAP host 400 furthermore interfaces with elements of the network control center equipment, such as the billing system, the administration system, and the network programming electronics.

Figure 4:
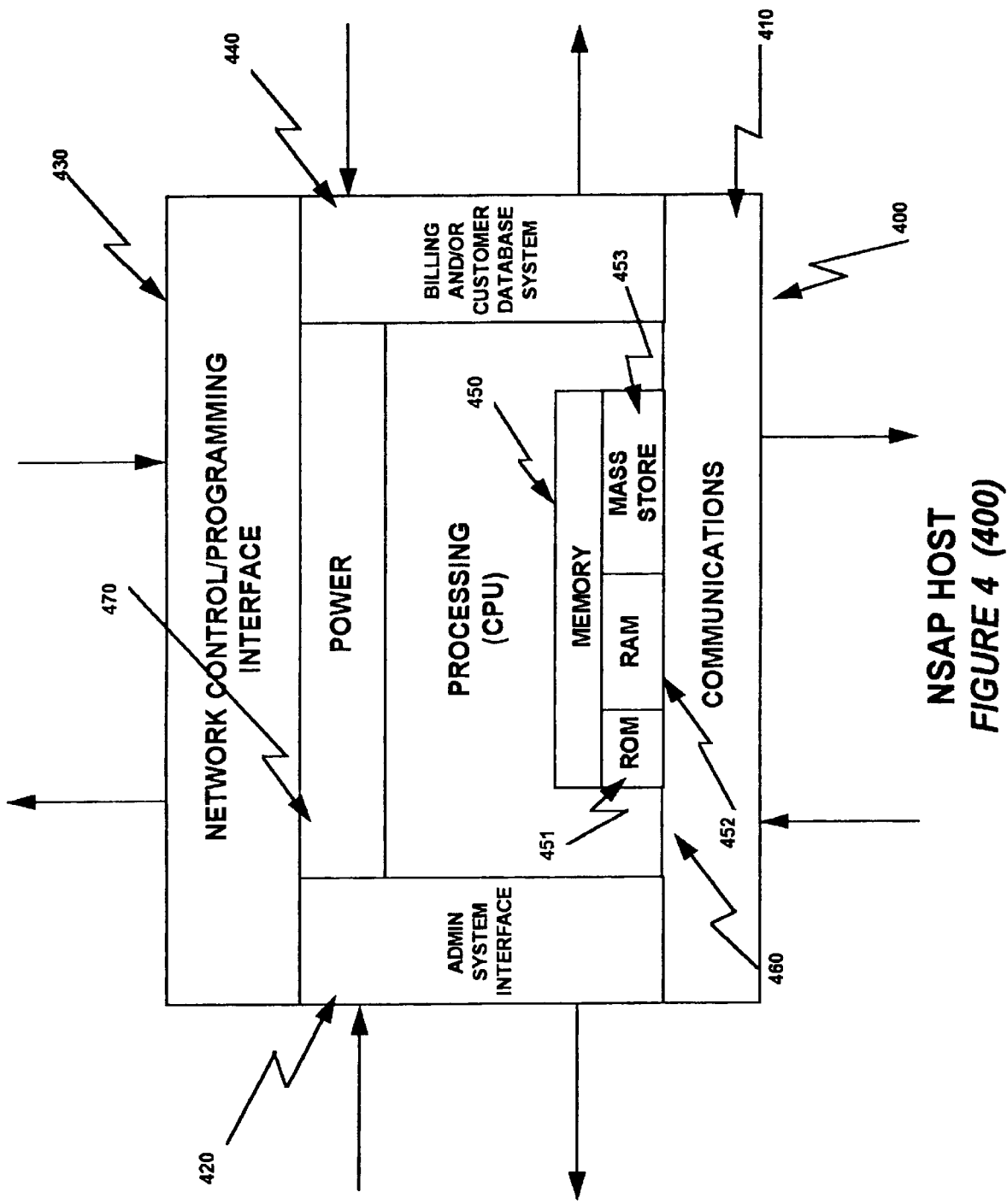
FIG. 4 shows a block diagram of a preferred embodiment of the internal subsystems within a network service access platform host.

FIG. 4 shows a block diagram of the internal subsystems within a preferred embodiment of NSAP host 400. A central processing unit 460 provides the data process function for NSAP host 400. CPU 460 has both master and associated sixty-four, thirty-two and sixteen bit processors to increase processing power and speed. CPU 460 works under control of a re-writable read only memory 451 based program code, operating system code, and applications program code. CPU 460 accesses all memory types within a memory subsystem 450, which include rewritable read only memory 451, high speed random access memory 452, and mass storage memory 453, which is divided into fixed and insertable/removable memory.

Communications functions between NSAP 300 and host 400 are provided by communications subsystem 410 under the control of CPU 460. Communications 410 includes microprocessors which accept and operate on digital data from the other subsystems of host 400. This digital data is intended to represent down line loads such as operating, diagnostic, application programs or customer specific database information intended for one or many NSAPs on the network. In response to this data received, communications 410 commands transmission to the NSAPs relative to said received data. In addition, up-line loads are received from one or more NSAPs. Such a command is issued by a directed polling algorithm. Communications 410 further controls the order in which multiple NSAPs will transmit should a near simultaneous request be made by multiple NSAPs.

There is a single set of interfaces between the internal subsystems of host 400 and communications 410. The interface between communications 410 and the external transmission medium may vary, however, depending upon the electrical and physical characteristics of that medium.

The primary function of communications 410 is to transmit and receive information. When transmitting, communications 410 accepts information whose source is internal to host 400, formats it into readable host/NSAP digital communications protocol, which includes an identification of which NSAP and identification of end-users to which the customer specific information applies, translates this protocol to signaling formats, and outputs that format to the transmission medium. When receiving, communications 410 accepts addressed information and translates it from the network signaling formats, into the format used internal to host 400.

Host 400 must transfer and receive information from the administration system used by the network control/programming center. This activity is facilitated by a host administration system interface 420 that automates the flow of information. Administration interface 420 further provides a means for reporting network diagnostic information. Such information informs the administration system of operational problems that are existent within the network.

Similar to the other noted subsystems, the internal interface between administration interface 420 is fixed. The interface external to host 400 and administration interface 420, however, must match that of the network operator's/programmer's administration system. The external interface of administration interface 420 is therefore designed to be compatible with such administration system. Administrative interface 420 furthermore includes the ability to provide paper output, flat file output on magnetic media, applications specific formatted file output on magnetic media, direct electronic information transfer either in flat or formatted file form and in direct serial, direct parallel, or LAN based transmission formats. Visual outputs also are provided.

Correlation between the actions of the remote NSAPs within each communications channel is dependent on actions taken by the network control/programming equipment within the control center. Information is therefore transmitted by this equipment through a network control/programming interface 430. CPU 460 controls this exchange of information. Such information includes modulation formats for signals, which includes vestigial sideband modulation, quadrature amplitude modulation, frequency division multiplex, orthogonal frequency division multiplex, coded orthogonal frequency division multiplex, phase modulation, N level phase modulation, frequency shift keying, code division multiplex, spread spectrum modulation, amplitude modulation, and other known formats.

Information from NSAP uploads to host 400 includes customer records for the access port, service selection information, the time at which an end-user chooses to use specific network services, and the time of conclusion use. Such information is used for billing and other purposes. Billing and customer database interface 440 is used to facilitate this information exchange, where database interface 440 directs such information to and from appropriate databases within the control center, thereby providing bi-directional communications.

Host 400 therefore provides the master information and communications platform with which the remote NSAPs interact. Host 400 further provides the bridge between the NSAPs and other equipment located at the control center. Host 400 additionally provides information to specific database memory locations within a particular NSAP. Such information may be both operational and customer specific information.

Each of the subsystems/modules disclosed within NSAP host 400 is comprised of conventional hardware and software systems known in the art.

A network services identification control system 500, hereinafter referred to as "NSIS 500", is disposed within the customer premises to effectuate end-user requests for service and to monitor equipment usage. Signals emitted from NSIS 500 are received either at the head-end of the network or at a local NSAP, and acted upon by the other network subsystems. NSIS 500 provides a means for allowing the end-user to personalize the network services that the end-user wishes to be available at the customer premises, providing information about such personal choices to the network operator/programmer, accepting, rejecting, or monitoring requests from the end-user for network services, encoding these service requests, and transmitting them to a serving apparatus for provision of service, maintenance, billing, and other related functions.

Figure 5:
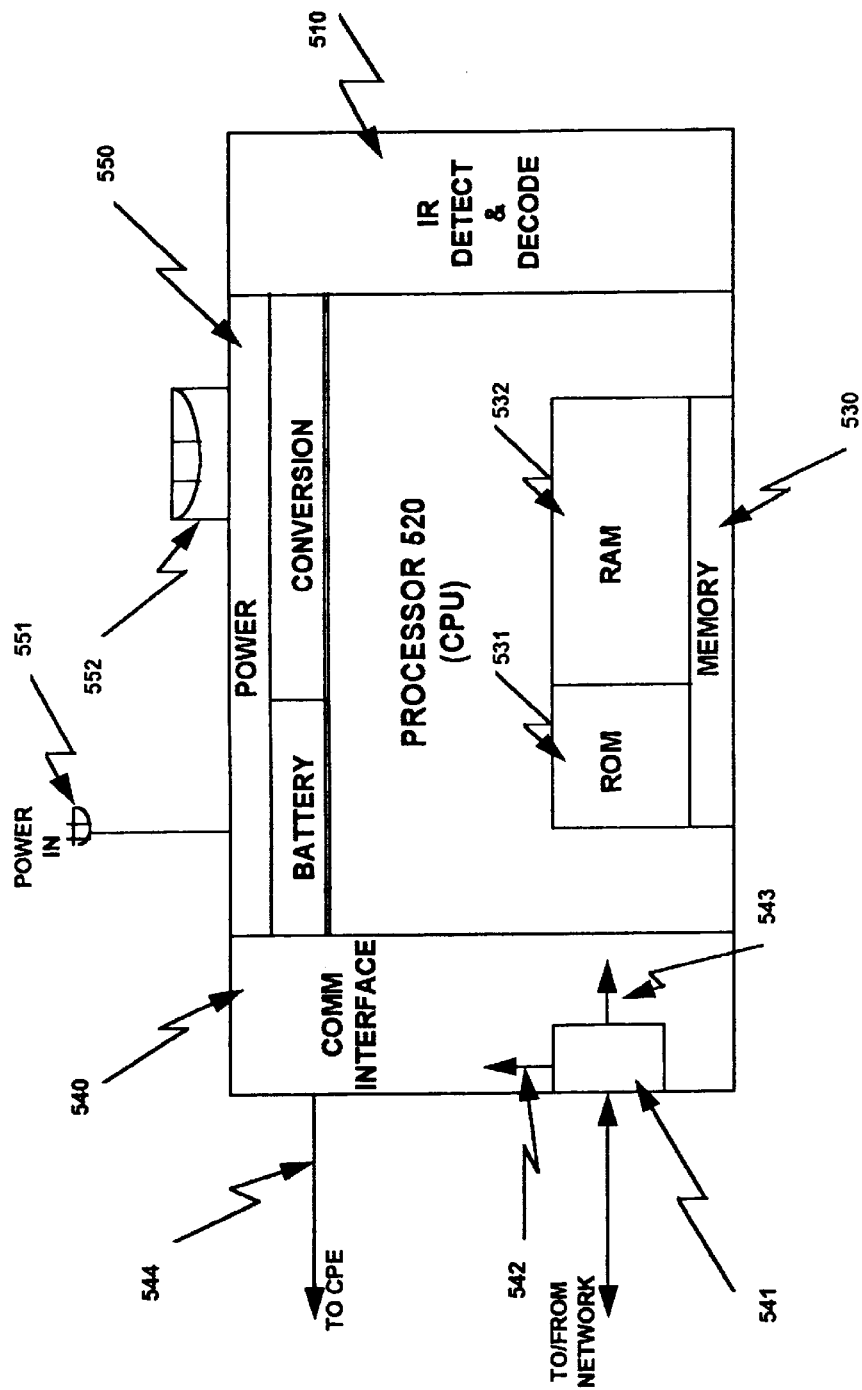
FIG. 5 shows a block diagram of a preferred embodiment of the external subsystems within an external network services identification/control subsystem.

FIG. 5 shows a block diagram of a preferred embodiment of the internal subsystems within an external NSIS 500. An infrared detector and decoder 510 detects a request for service and/or channel use by detecting the infrared signals of the service selector and conveying them internally to a central processor unit 520. CPU 520 processes these signals and stores them in a non-volatile random access memory 532. CPU 520 also processes end-user service demands, validates them against an end-user specific database stored in random access memory 532, and takes action based upon the result of the validation. CPU 520 then interprets the demand and provides a signal to a communications module 540. Communications module 540 then communicates with and transmits the demand to the network through input/output port 541, completing the cycle. Communications module 540 must be selected to match the network medium for proper communication.

In a preferred embodiment of the invention, NSIS 500 further includes a means for delivering incoming service to the customer premises equipment. NSIS 500 receives incoming signals through port 541 and transmits it to the customer premises equipment through port 544.

NSIS 500 receives power from a power module 550 that in a preferred embodiment includes an a.c. power main 551, and in an alternative embodiment includes a battery.

CPU 520 operation is controlled by an operating system which is stored in electrically changeable read only memory 531. Read only memory 531 further stores a network services database, device initialization information, and a library of infrared translation information. Random access memory 532 further stores customer specific information and is used to support microprocessor activity.

Figure 6:
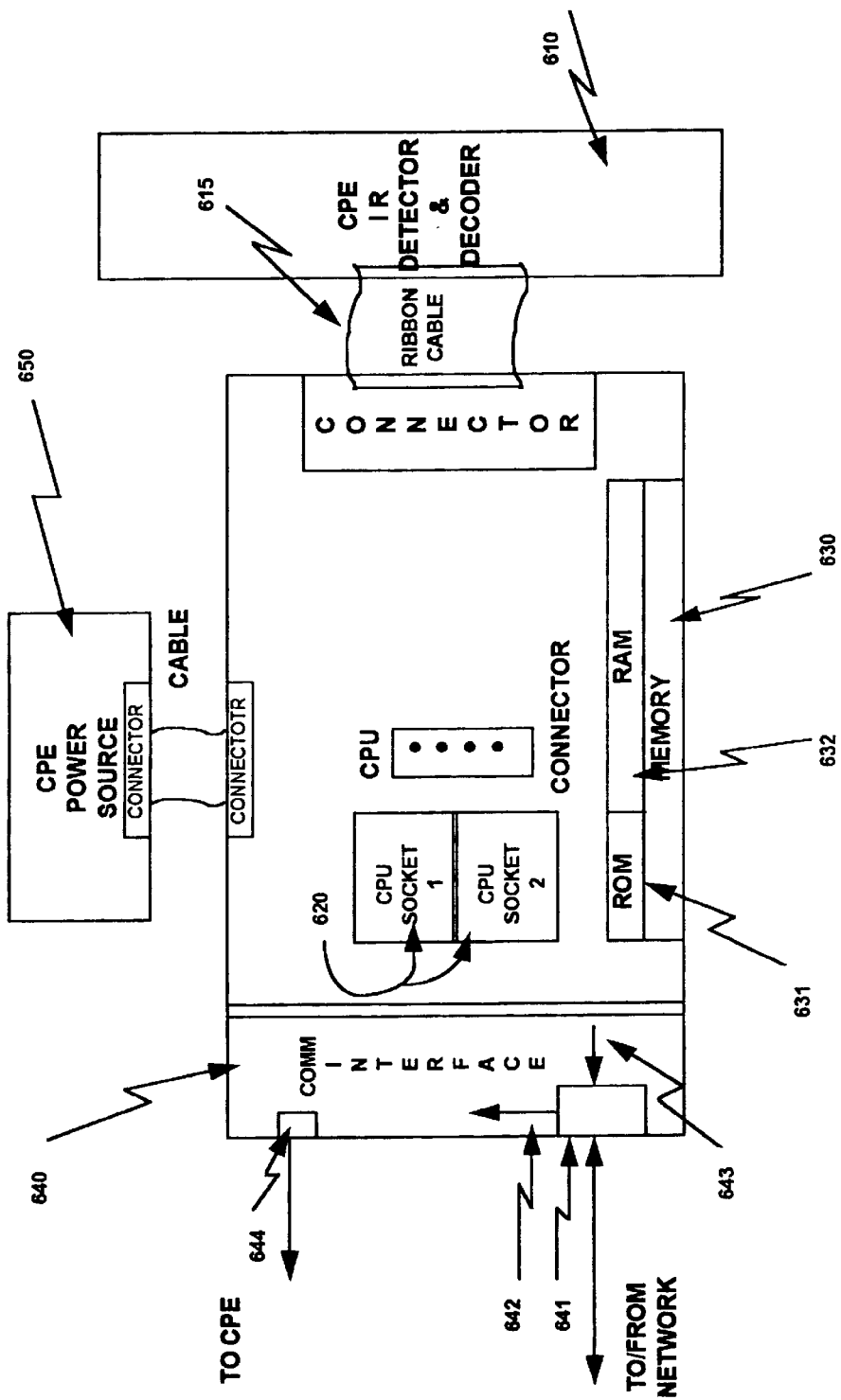
FIG. 6 shows a block diagram of a preferred embodiment of the internal subsystems within an internal network services identification/control subsystem.

FIG. 6 shows a block diagram of a preferred embodiment of the internal subsystems within an internal NSIS 600 that is capable of being disposed directly within customer premises equipment. NSIS 600 includes parts that correspond to those existent within external NSIS 500, specifically CPU 620, ROM 631, RAM 632, and communications 640 with accompanying ports. A power connector 650 connects NSIS 600 to the power source within the customer premises equipment to provide power to the internal subsystems/modules. Finally, a connector cable 615, which includes a ribbon cable in a preferred embodiment, connects NSIS 600 electrically and physically to a customer premises microprocessor that detects and decodes infrared signals, similar to that of infrared detector 510 of external NSIS 500.

External NSIS 500 and internal NSIS 600 are each individually capable of acting in conjunction with NSAP 300, where NSAP 300 serves to provide access to the information network. As previously noted, however, a preferred embodiment of NSAP 300 can also monitor use and effectuate end-user requests for specific services without the need for NSIS 500 or NSIS 600. Connection for NSAP 300 is typically between customer interface module 340 and the customer premises equipment through a drop cable.

Each of the subsystems/modules disclosed within NSIS 500 and NSIS 600 is comprised of conventional hardware and software systems known in the art.

A network services identification/control host 700, hereinafter "NSIS host 700", serves as the controller and information retrieval device for a plurality of NSISs only. NSIS host 700 provides control through a set of software programs and database information which are conveyed to the NSISs through a series of down-line loads. It receives the retrieved information in a series of up-line loads.

NSIS host 700 is similar in architecture, design, and function to NSAP host 400. NSIS host 700, however, has fewer interface modules and different operating software. It serves to act primarily as a monitoring device. It therefore is for use as an entry level device, and consequently serves as a less expensive alternative to a full system utilizing NSAP host 400 with NSAP 300 and NSIS 500 or NSIS 600.

Figure 7:
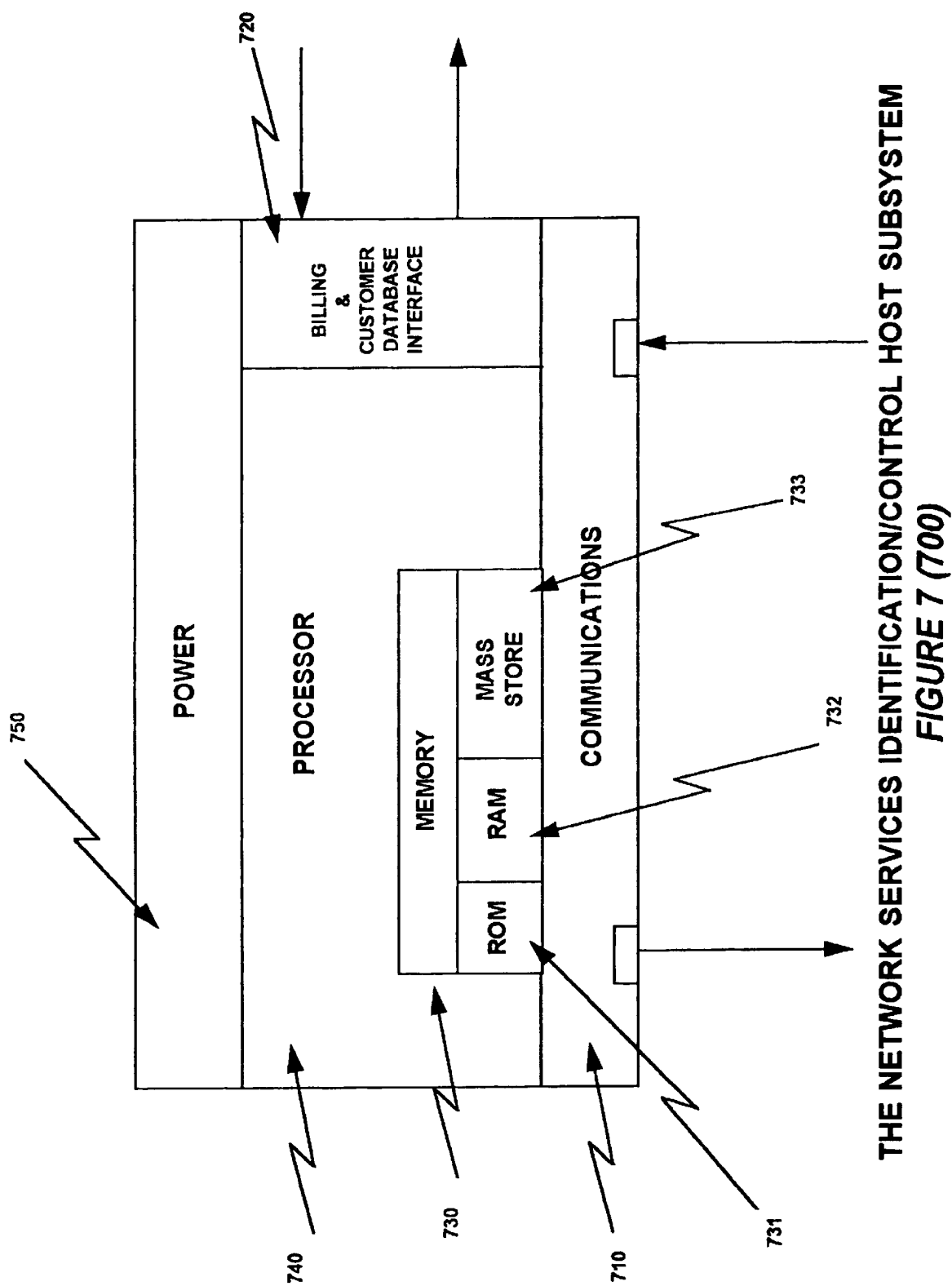
FIG. 7 shows a block diagram of a preferred embodiment of the internal subsystems within a network services identification/control host subsystem.

FIG. 7 shows a block diagram of a preferred embodiment of the internal subsystems within NSIS host 700. Central processing unit 740 provides the data processing function, having sixty-four, thirty-two and/or sixteen bit processors to increase processing power and speed. CPU 740 works under the control of an operating system that provides a multitasking computing environment. Three types of data memory are utilized, including high speed random access memory 732, re-writable read only memory 731, and mass storage memory 733, which is divided into fixed and insertable/removable.

NSIS host 700 communicates with the network through communications subsystem 710, which operates under the control of CPU 740. Communications 710 includes microprocessors which accept data from a control center billing and customer database interface 720, which receives such data from the control center databases. That data represents down line loads representing end-user specific database information intended for the NSISs. Under the control of CPU 740, communications 710 furthermore has the capability to transmit data to down-line NSISs in response to requests for data.

There is a single set of interfaces between the internal subsystems of NSIS host 700 and communications 710. The interface between communications 710 and the external transmission medium, however, may vary depending upon the electrical and physical characteristics of that medium. Accordingly, communications 710 is designed to be compatible with such medium.

The primary function of communications 710 is to transmit and receive information. For transmission, communications 710 accepts information whose source is internal to NSIS host 700, formats it into communications protocol, translates the protocol to signaling formats, and outputs the signaling formats to the transmission medium. For reception, communications 710 accepts addressed information and translates it from the network signaling formats to the format used internal to NSIS host 700.

Similar to NSAP host 400, NSIS host 700 provides information for billing and other statistical purposes through billing interface 720. Billing interface 720 updates the information flow of billing for control center databases, and includes the same outputs as discussed with NSAP host 400.

NSIS host 700 receives power from power receiver 750. Any conventional power source may be used, including a battery, an a.c. power source, uninterrupted power systems, or similar power supplying devices.

Each of the subsystems/modules disclosed within NSIS host 700 is comprised of conventional hardware and software systems known in the art.

Figure 8:
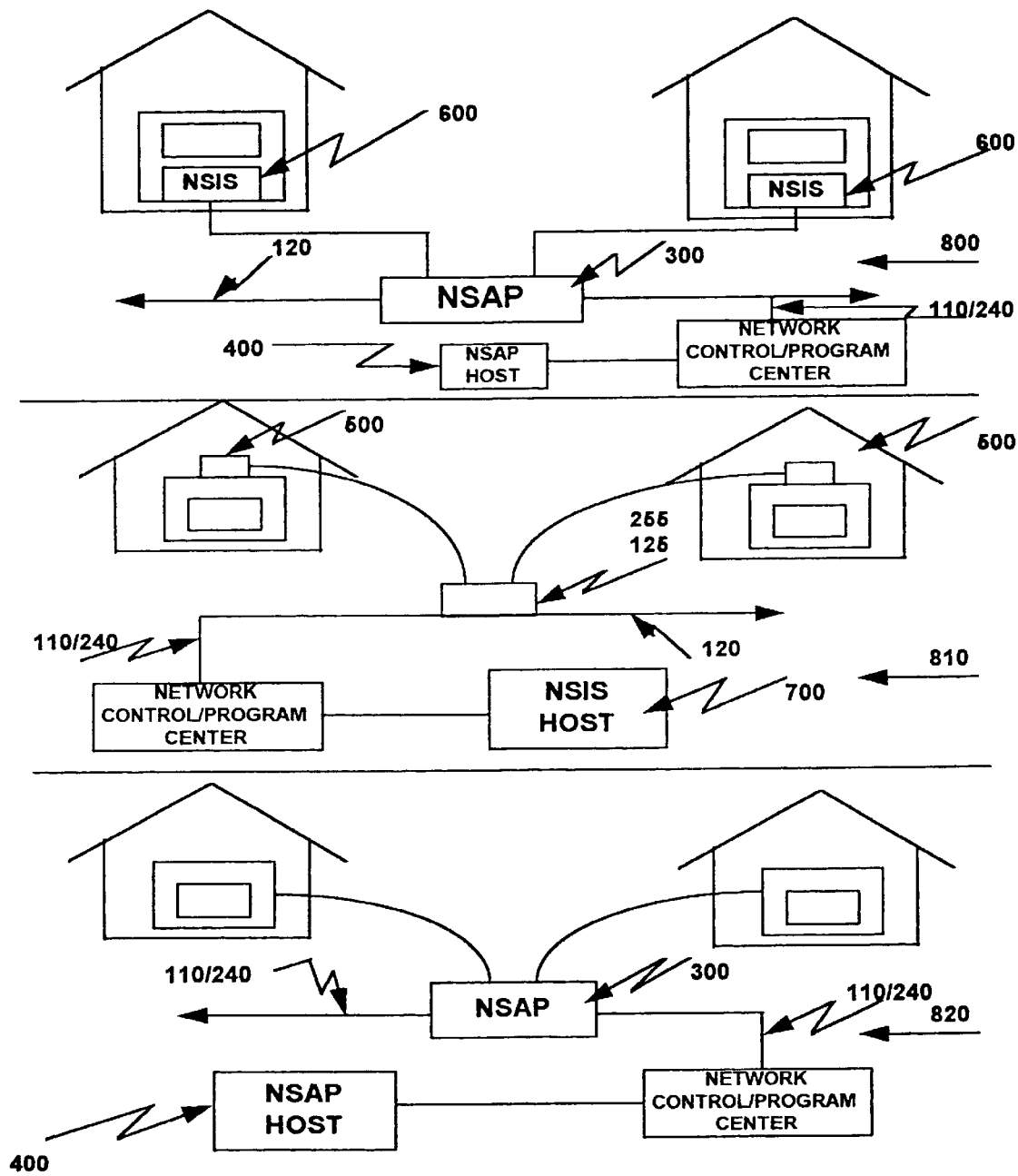
FIG. 8 shows a schematic of the various combinations of subsystems to effectuate the entire bi-directional information transmission network in accordance with the present invention.

FIG. 8 shows a schematic of the various combinations of subsystems to effectuate the entire bi-directional information transmission network in accordance with the present invention. Each disclosed network transmits or can be augmented to transmit bi-directional data signals between its head-end, the network control center, and its back-end, the customer premises. Network 800 shows a preferred embodiment, including the combination of NSIS 500 or NSIS 600 with NSAP 300 and NSAP host 400. Network 810 shows an alternative embodiment, including the combination of NSIS 500 or NSIS 600 with NSIS host 700. Such a system, network 810, is capable only of capturing end-user service request information for billing and other service use and providing minimum services access control. Network 820 shows another embodiment of the present invention, including NSAP 300 in combination with NSAP host 400. Note that NSAP 300 directly interfaces with the customer premises and functions without either NSIS 500 or NSIS 600. NSAP 300 of network 820 includes a means for detecting service signal selection and usage, such as a detector and decoder for customer premises equipment upstream signals.

FIRST EXAMPLE

VIDEO DIAL TONE APPLICATION WITH DEDICATED CHANNELS CARRYING MULTI-MEDIA SERVICES

A request for service is made on the preferred embodiment multi-media services transmission access system 800, where the end-user pushes an infrared driven remote control to select a service on dedicated channel 103. Infrared detector 510 of NSIS 500, or infrared detector 610 of NSIS 600, detects this signal, decodes it, and CPU 520, or CPU 620, directs transmission through communications 540, or communications 640, to customer interface module 340 of NSAP 300. CPU 308 directs the decoded request in terms of commands to network interface module 310. Signal processing module 320 decodes and further processes the signal, as communications 330 again formats the signal into proper form for transmission via customer interface 340, to communications 540 of NSIS 500 or communications 640 of NSIS 600. From port 541, the signal is transmitted to the multi-media terminal through port 544, thus delivering the service on channel 103 to the customer premises equipment.

While the signals are being transmitted through the network, a specific data record is being updated at a NSAP customer specific database. The time that end-user has selected channel 103 is recorded. When end-user decides to stop using the service on channel 103, a process similar to that described above is performed, thus ending transmission and billing for channel 103.

SECOND EXAMPLE

A CABLE TELEVISION APPLICATION USING EITHER VIDEO DIAL TONE OR CABLE TELEVISION BROADCAST NETWORK

A request for service is made on the preferred embodiment multi-media access system 800 where the end-user pushes an infrared driven remote control to select channel 51. Infrared detector/decoder 510 of NSIS 500, or detector/decoder 610 of NSIS 600, directs transmission through communications 540, or communications 640, to customer interface module 340 of NSAP 300. Communications module 330 translates this information to proper form for submission to signal processing module 320 and to CPU 308. CPU 308 verifies that this service selection is allowed by referring to customer specific memory 307 which contains specific customer preference information. If allowed, CPU 308 and signal processing module 320 operate together to select channel 51 from the broadband signal consisting of all of the channels present at an output 315 of network interface 310. Note that the information in channel 51 may be formatted to maximize the use of the transmission network 110 and 120, or 240 and 250. An example would be MPEG2 encoding and compression. It could also be in NTSC (PAL and SECAM in other countries) format.

Under direction of CPU 308 and the databases residing in a memory 301 and 307, the video information in channel 51 is processed by signal processing module 320. This processing provides the proper format for application through communications module 330 to customer interface module 340 for delivery to NSIS 500, or NSIS 600, making the request for channel 51. Upon receipt, NSIS 500 provides channel 51 to the customer premises equipment through port 544, or port 644.

CPU 308 also creates a record of the customer's service selection in customer specific memory 307 and identifies the service, the network time of selection, and the network time the service was deselected; i.e. the customer changed the channel or shut off the television set. This selection information is up-loaded periodically by interaction between CPU 308, communications module 330, and network interface module 310. This up-load is performed upon command of NSAP host 400, or by granting of a request to NSAP host 400 for transmission.

The information transmission systems discussed above further provide for product or service commercial substitution to target audiences. The network control/programming center provides selected full run length commercials on channels in the network set aside for this purpose. These channels are intended for specific end-users and are based upon their preferences and buying patterns such that the information is most useful to them. When the signal being viewed goes to commercial, the customer specific database within NSAP 300 directs CPU 308 to issue commands to signal processing module 320 to select the information residing in a predetermined "commercials" channel, and to apply it to channel 51 for delivery to the customer's premises.

An alternative means for creating the commercial to be substituted is as follows. Commercial video building blocks are resident in memory or in channels reserved for that purpose. The customer specific memory in the serving NSAP contains a "video script" which identifies the required selection of "building blocks" for that customer. Signal processing module 320, under control of CPU 308, exercises this selection sequence and applies the resulting signal to the customers drop line 260/130. In either embodiment, such a system more efficiently disseminates commercial distribution and it significantly increases the revenue to the network operator/programmer.

The systems disclosed, and the individual subsystems provided therein, therefore solve the noted problems existent in the art, many of which were discussed previously. The disclosed invention therefore accomplishes each of the noted objects of this invention.

Although specific features of this invention are shown in some drawings and not others, this is for convenience only as some feature may be combined with any or all of the other features in accordance with this invention.

The foregoing is considered as illustrative only of the principles of the invention. Furthermore, since numerous modifications and changes will readily occur to those skilled in the art, it is not desired that the foregoing limit the invention to the exact construction and operation shown and described. Accordingly, all suitable modifications and equivalents may be resorted to that appropriately fall within the scope of the invention. Other embodiments therefore will occur to those skilled in the art and are within the scope of following claims:

I claim:

1. A broadband communications network services access platform host that receives, transmits, processes, and stores information signals at the headend of a transmission network having elements including down-line network service access platforms, the transmission network carrying broadband optical and/or electrical signals which include control signals, and which represent voice information, digital and analog data information including customer billing information, and imagery information including video, the broadband communications network services access platform host comprising:

a. a means for storing information, such information including a host operating system;

b. a central processing unit-based broadband information network access controller, responsive to the operating system stored within the means for storing information, for controlling the transmission and receipt of digital information and control signals;

c. a receiving means, responsive to the network access controller, for receiving customer billing information from the network services access platforms; and d. a communication means, responsive to the network access controller, for communicating with at least one network services access platform in the transmission network, the communication means output to the network services access platform including operating and application program data for the network services access platforms.

2. The network services access platform host of claim 1, in which the network further includes a network control center with a control center database, the host further including a means for interfacing with the network control center database.

3. The network service access platform host of claim 2, in which said network control center database includes an end-user specific database having a plurality of end-user specific records.

4. The network services access platform host of claim 1, further including a means for reporting network diagnostic data.

5. The network services access platform host of claim 4, in which said reporting means includes automating means for automatically accomplishing flow of said diagnostic data between the network control center and said host.

6. The network services access platform host of claim 5, in which said automating means includes a means for providing formatted and unformatted data output.

7. The network services access platform host of claim 1, in which said central processing unit includes at least one $2^N$ bit master processor and at least one $2^{N-1}$ bit slave processor to increase processing power and speed.

8. The network services access platform host of claim 1, in which said means for storing information includes random access memory, read only memory, and mass storage memory, said mass storage memory including fixed and removable memory.

9. The network services access platform host of claim 1, in which said receiving means transmits program information to said communication means, for transmission of the program information to a network services access platform.

10. The network services access platform host of claim 1, in which said communication means includes a microprocessor, said microprocessor communicating with said central processing unit and controlling the flow of program data through said communication means.

11. The network service access platform host of claim 10, in which said communication means includes a means for formatting programming information into a readable format for said network services access platform prior to transmission.

12. The network services access platform host of claim 10, in which said communication means accepts addressed data from a network services access platform, and includes a means for translating accepted addressed data from said network services access platform into a readable format used by said host.

* * * * *